US007007369B2

(12) United States Patent
Lee

(10) Patent No.: US 7,007,369 B2
(45) Date of Patent: Mar. 7, 2006

(54) MANUFACTURING METHOD OF SHAFT SLEEVE STRUCTURE

(75) Inventor: Ta Yi Lee, Shindian (TW)

(73) Assignee: Lite-On Technology Corporation, Taipei (TW)

( * ) Notice: Subject to any disclaimer, the term of this patent is extended or adjusted under 35 U.S.C. 154(b) by 42 days.

(21) Appl. No.: 10/781,033

(22) Filed: Feb. 17, 2004

(65) Prior Publication Data

US 2004/0165922 A1    Aug. 26, 2004

Related U.S. Application Data

(62) Division of application No. 10/068,822, filed on Feb. 5, 2002, now abandoned.

(30) Foreign Application Priority Data

Jul. 24, 2001    (TW) ............................ 90118094 A

(51) Int. Cl.
*B23P 19/02*    (2006.01)
*B21D 39/03*    (2006.01)
(52) U.S. Cl. ......................................... 29/525; 29/428
(58) Field of Classification Search .................. 29/525, 29/428, 855; 464/162, 167, 178; 384/29.42, 384/59; 358/474, 497; 399/107, 211, 213, 399/316; 359/198–200
See application file for complete search history.

(56) References Cited

U.S. PATENT DOCUMENTS

| 2,175,705 | A | 10/1939 | Scott ............................... 308/4 |
| 5,286,232 | A | 2/1994 | Engle .......................... 464/162 |
| 5,691,825 | A | 11/1997 | Fujiwara ...................... 358/497 |
| 6,285,483 | B1 | 9/2001 | Shia et al. .................. 359/196 |
| 6,578,657 | B1 | 6/2003 | Baxter, Jr. ................... 180/376 |

FOREIGN PATENT DOCUMENTS

| DE | 39 36 130 A1 | 5/1990 | .................. 384/42 |
| JP | 61-175713 | 8/1986 | .................. 384/42 |
| JP | 3-140621 | 6/1991 | .................. 384/42 |

*Primary Examiner*—John C. Hong
(74) *Attorney, Agent, or Firm*—Peter F. Corless; Christine C. O'Day; Edwards Angell Palmer & Dodge, LLP

(57) ABSTRACT

A shaft sleeve structure for use in a module capable of being slid along a guiding shaft and the manufacturing method thereof are provided. The shaft sleeve structure includes: a passage punched through the module for receiving the guiding shaft and providing a first opening segment, a second opening segment and a central segment, wherein the first opening segment has an internal diameter larger than that of the second opening segment, and the central segment has an internal diameter gradually tapered from the first opening segment to the second opening segment; a first bearing having an external diameter mounted in the first opening segment and having an internal diameter for slidably receiving therein the guiding shaft; and a second bearing having an external diameter mounted in the second opening segment and having an internal diameter for slidably receiving therein the guiding shaft.

9 Claims, 6 Drawing Sheets

MANUFACTURING METHOD OF SHAFT SLEEVE STRUCTURE

This application is a divisional application Ser. No. 10/068,822, filed on Feb. 5, 2002, now abandoned.

FIELD OF THE INVENTION

The present invention is related to a shaft sleeve structure and a manufacturing method thereof, and more particularly, to a shaft sleeve structure for use in a module capable of being slid along a guiding shaft and a manufacturing method thereof.

BACKGROUND OF THE INVENTION

Please refer to FIG. 1(a). FIG. 1(a) is a schematic view showing the supporting base 10 and the guiding shaft 11 cooperating with each other inside an image scanner according to the prior art. It shows clearly in the view that the supporting base 10 is mounted on the guiding shaft 11 for being slid along the guiding shaft 11.

Please refer to FIG. 1(b). FIG. 1(b) is a sectional view showing the structures of the shaft sleeve 101 and the bearing 102 which are needed when the supporting base is mounting on the guiding shaft 11 according to the prior art. The shaft sleeve 101 is manufactured together with the housing of the supporting base 10. The bearing 102, which is usually made of metal, is mounted at two ends of the shaft sleeve 101 by way of being pressed thereinto directly after the shaft sleeve 101 is formed. The relationship between the. central parallel precision of two end bearings 102 and the clearance between the bearing 102 and the guiding shaft 11 could be: (1) the central parallel precision of two end bearings 102 has a swing value smaller than the clearance between the bearing 102 and the guiding shaft 11. Therefore, by reducing the clearance between the bearing 102 and the guiding shaft 11, a smallest clearance and a smallest swing value in an optic module can be obtained and the best image quality is obtained then. (2) The central parallel precision of two end bearings 102 has a swing value larger than the clearance between the bearing 102 and the guiding shaft 11. Therefore, when the clearance between the bearing 102 and the guiding shaft 11 is not large enough, it might cause the dryness and jamming and result in the scanning operation stopped. In such way, the clearance between the bearing 102 and the guiding shaft 11 must be increased in order to obtain a largest clearance and a largest swing value in an optic module. However, the image quality is thus usually not good.

Therefore, the swing value of the central parallel precision of two bearings 102 is related to the image quality. The central precision at two ends of the shaft sleeve 101 on the optic module main body is related to the integral precision after the bearing 102 is assembled. It is therefore the main problem how we can obtain a perfect track. In the present time, the shaft sleeve design of the optic module main body must consider the complexity of the module structure, the easiness of drawing the mold or the mold injection and the structural strength of end product. Generally, it can be divided into two forms as follows:

The first kind of shaft sleeve structure as shown in FIG. 2(a) has a structural feature that the central part 201 of the shaft sleeve 20 is cut-out. During the process of manufacturing the shaft sleeve 20, the shaft sleeve 20 is obtained by shaping the forward slider and the backward slider (not shown in the drawing) respectively. The sliders have shorter length so that the two sliders can be driven to be drawn out along the guiding member (not shown in the drawing) by the driving force while drawing the mold. The advantage is that mold injection is easy to be accomplished and the concentric precision can still be maintained in the beginning without any extra auxiliary mechanism. Nevertheless, the disadvantage is that the slider contacts with the guiding member (not shown in the drawing) directly so that the abrasion occurs with the production time and the production quantity, and the concentric precision starts to be reduced. In addition, due to the central part is cut-out, the structural strength of the end product is weaker.

The second kind of shaft sleeve structure as shown in FIG. 2(b) has a structural feature that the central part 211 of the shaft sleeve 21 is intact. During the process of manufacturing the shaft sleeve 21, the shaft sleeve 21 is directly shaped from one single slider with an identical diameter. Therefore, the advantage is that the concentric precision is higher, the structural strength of the product is stronger, and the mold structure is simpler. However, since the slider is longer, the disadvantage is that an auxiliary mechanism (oil pressure cylinder) is needed to drive the slider to be drawn out. In addition, due to the diameter of the slider is identical, the mold-drawing angle is so small that it is almost zero. The mold injection is thus more difficult. Besides, the internal diameters of the forward shaft sleeve and the backward shaft sleeve are often different, so the precision can not be controlled easily after assembled.

From the above, the different shaping ways of shaft sleeve and the different structures thereof will affect the scanning quality and the enduring ability of an image scanner seriously. Thus, how to rectify the foresaid conventional drawback is the main purpose of the present invention.

SUMMARY OF THE INVENTION

It is another object of the present invention to provide a shaft sleeve structure having a higher concentric precision and a simpler mold structure.

It is another object of the present invention to provide a shaft sleeve structure, wherein the end product has stronger structural strength.

It is another object of the present invention to provide a shaft sleeve structure, wherein the mold injection is easy to be drawn mold, and the precision of the injection product and the assembly are easy to be controlled.

It is another object of the present invention to provide a shaft sleeve structure having higher life-span and higher mold precision.

According to the present invention, a shaft sleeve structure for use in a module capable of being slid along a guiding shaft, includes: a passage punched through the module for receiving the guiding shaft and providing a first opening segment, a second opening segment and a central segment, wherein the first opening segment has an internal diameter larger than that of the second opening segment, and the central segment has an internal diameter gradually tapered from the first opening segment to the second opening segment; a first bearing having an external diameter mounted in the first opening segment and having an internal diameter for slidably receiving therein the guiding shaft; and a second bearing having an external diameter mounted in the second opening segment and having an internal diameter for slidably receiving therein the guiding shaft, wherein the internal diameter is the same as that of the first bearing.

In accordance with the present invention, the internal diameter of the central segment in the passage decreases linearly from the first opening segment to the second opening segment.

Preferably, the internal diameter of the central segment in the passage decreases non-linearly from the first opening segment to the second opening segment.

Preferably, each of the first and second bearing is made of a material selected from one of plastic and metal.

Preferably, the module is an optic module in an image scanner.

Preferably, the module is an optic module in a copy machine.

Preferably, the module is a printing head module in a printer.

According to another aspect of the present invention, a method of manufacturing a shaft sleeve structure for use in a module capable of being slid along a guiding shaft, comprising steps of: (a) providing a slider comprising a first segment, a second segment and a central segment, wherein the first segment has an outer diameter larger than that of the second segment, and the central segment has an outer diameter gradually tapered from the first segment to the second segment; (b) encapsulating the first segment, the second segment and the central segment of the slider within the module when forming the module; (c) providing a driving force for drawing out the slider in the direction from the second segment toward the first segment and defining a passage on the module; and (d) mounting a first bearing and a second bearing at two opening ends of the passage respectively, wherein the first bearing having an internal diameter the same as that of the second bearing.

In accordance with the present invention, the outer diameter of the central segment of the slider decreases linearly from the first segment to the second segment.

In accordance with the present invention, the outer diameter of the central segment of the slider decreases non-linearly from the first segment to the second segment.

Preferably, each of the first and second bearing is made of a material selected from one of plastic and metal.

Preferably, the module is an optic module in a image scanner.

Preferably, the module is an optic module in a copy machine.

Preferably, the module is a printing head module in a printer.

Preferably, the driving force is provided by an oil pressure pump.

Preferably, the module is formed by injection molding.

Preferably, the module is formed by die-casting.

The foregoing and other features and advantages of the present invention will be more clearly understood through the following descriptions with reference to the drawings, wherein:

DETAILED DESCRIPTION OF THE PREFERRED EMBODIMENT

Figure 3:
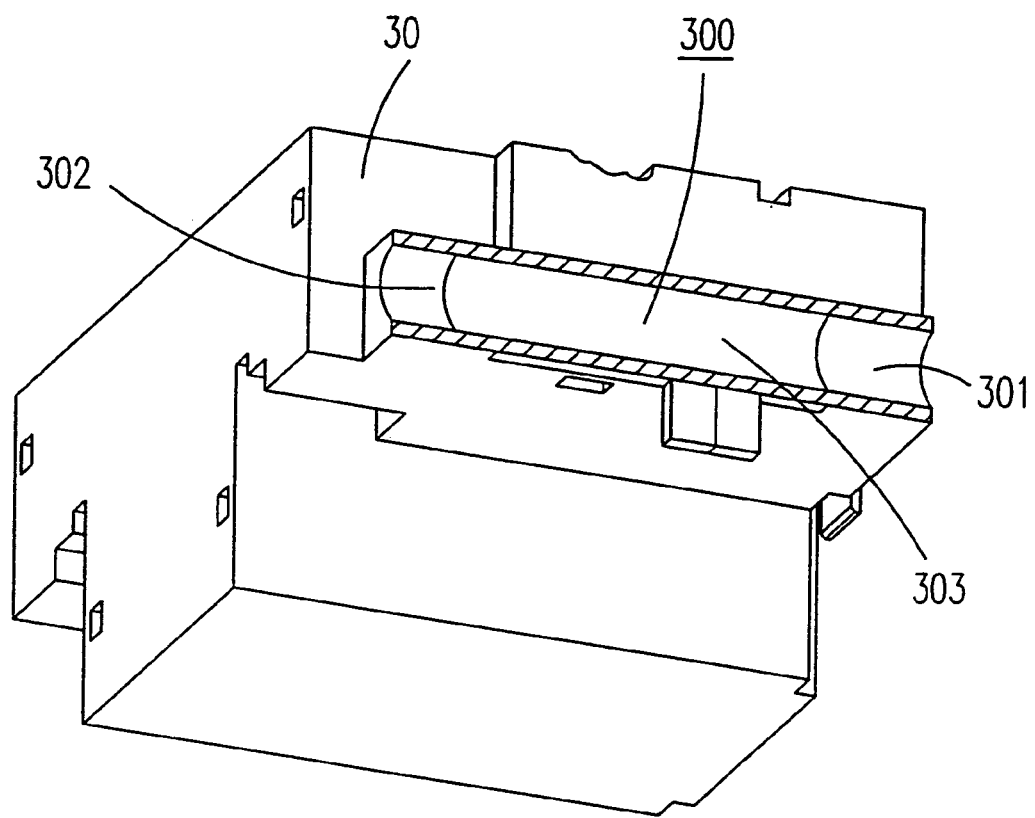
FIG. 3. is a sectional view showing the shaft sleeve structure. mounted on the module according to a preferred embodiment of the present invention.
Figure 4:
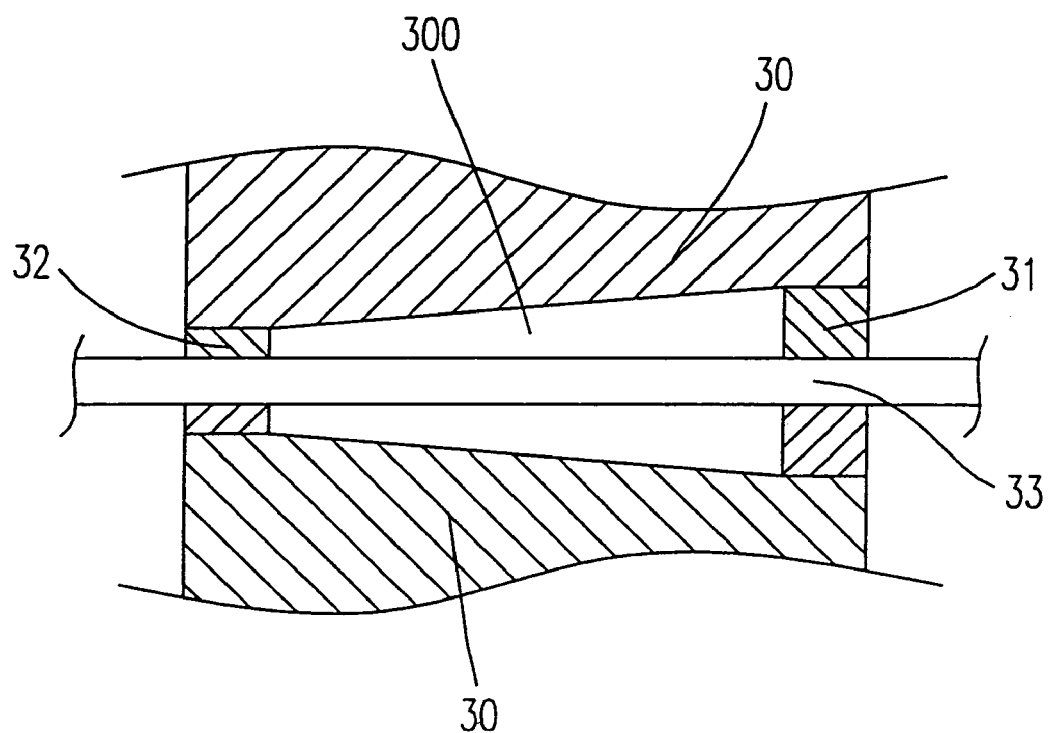
FIG. 4. is an enlarged sectional view showing the shaft sleeve structure according to a preferred embodiment of the present invention.

The present invention will now described more specifically with reference to the following embodiments. Please refer to FIG. 3. FIG. 3 is a sectional view showing the shaft sleeve structure mounted on the module according to a preferred embodiment of the present invention. It shows clearly in the drawing that the shaft sleeve structure is accomplished by a passage 300 passing through the module 30. The passage 300 includes a first opening segment 301, a second opening segment 302 and a central segment 303. Please refer to FIG. 3 and FIG. 4. FIG. 4. is an enlarged sectional view showing the shaft sleeve structure according to the preferred embodiment of the present invention. It further shows clearly in the drawing that the first opening segment 301 has an internal diameter larger than that of the second opening segment 302, and the internal diameter of the central segment 303 in the passage 300 changes linearly or non-linearly and decreases from the first opening segment 301 to the second opening segment 302.

The first bearing 31 is placed therein from the first end of the passage 300 and mounted in the first opening segment 301, and has an internal diameter for slidably receiving therein the guiding shaft 33. The second bearing 32 is placed therein from the second end of the passage 300 and mounted in the second opening segment 302, and has an internal diameter for slidably receiving therein the guiding shaft 33. The first bearing 31 has an internal diameter the same as that of the second bearing 32 for slidably receiving therein the guiding shaft 33. Each of the first and second bearings 31, 32 mentioned above is made of a material selected from plastic or metal.

Figure 1A:
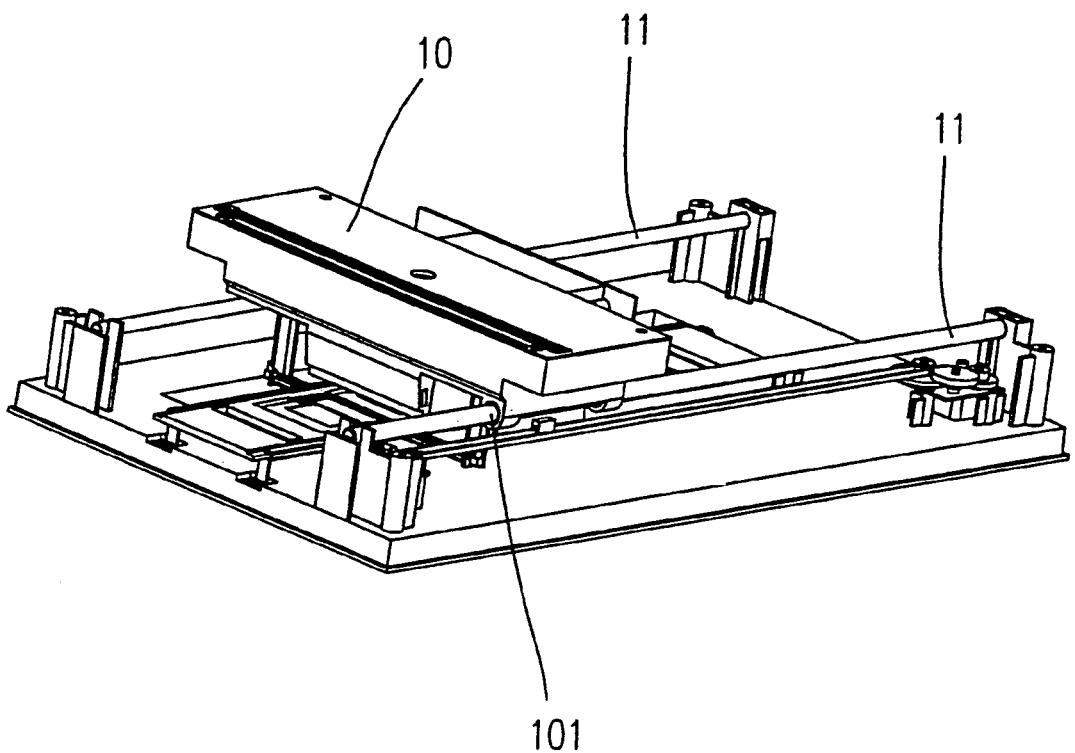
FIG. 1(a) is a schematic view showing the supporting base and the guiding shaft cooperating with each other inside an image scanner according to the prior art.
Figure 1B:
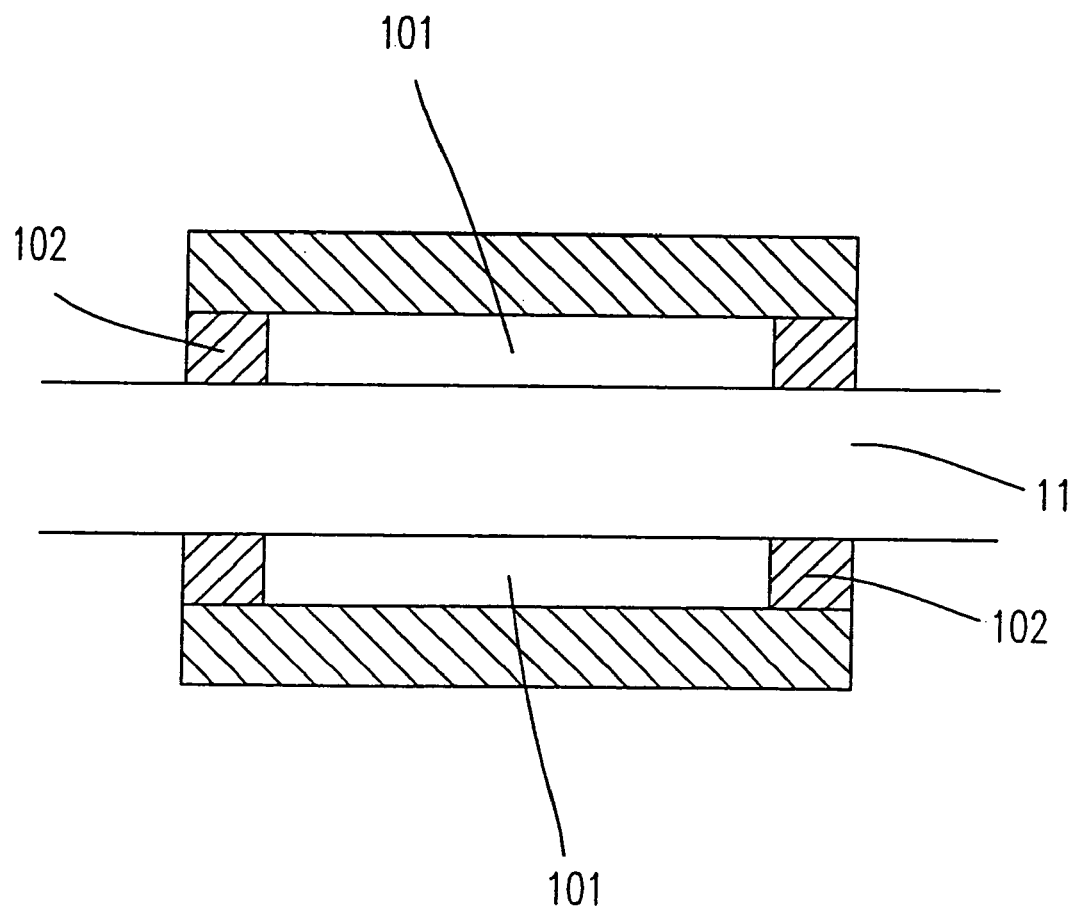
FIG. 1(b) is a sectional view showing the structures of the shaft sleeve and the bearing which are needed when the supporting base is mounted on the guiding shaft according to the prior art.
Figure 2A:
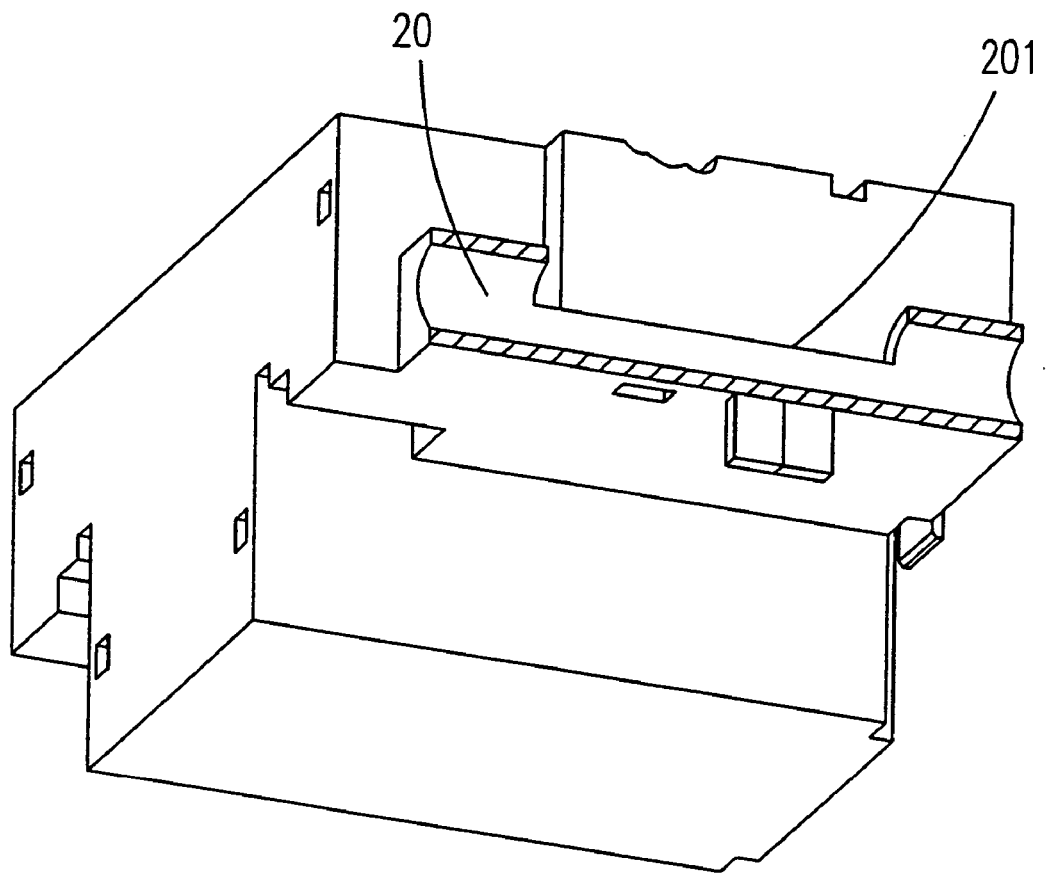
FIG. 2(a) is a schematic view showing a first kind of shaft sleeve structure according to the prior art.
Figure 2B:
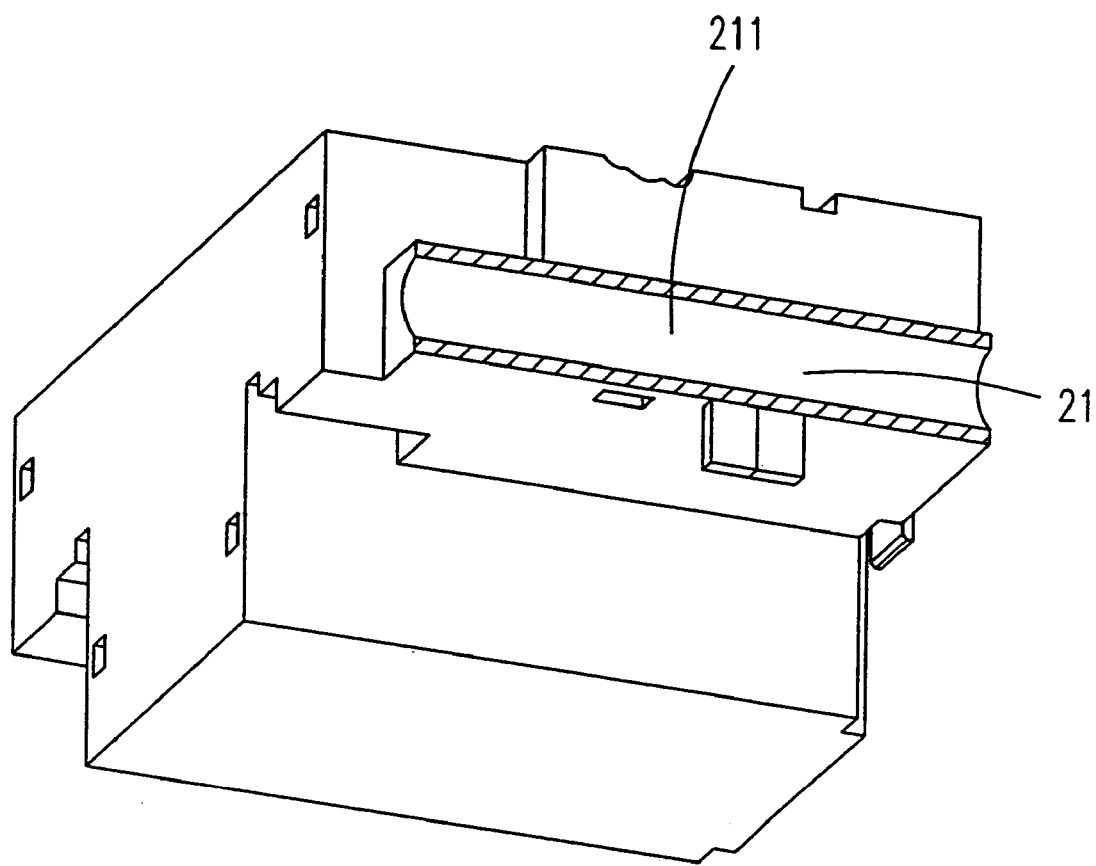
FIG. 2(b) is a schematic view showing a second kind of shaft sleeve structure according to the prior art.

From the above, the manufacturing method of the shaft sleeve in the present invention is similar to the conventional way as shown in FIG. 2. The module 30 is formed mainly by injection molding, wherein one single slider is shaped and driven to be drawn out by the driving force provided by an oil pressure cylinder while drawing mold. Therefore, the advantages are kept (i.e. the concentric precision is higher, the structural strength of the product is stronger, and the mold structure is simpler). Except these, the slider has different diameters in the forward end and the backward end, wherein the end (distant end) of drawing mold ahead has an diameter smaller than that of the end (proximal end) of drawing mold afterward. It is therefore that the mold drawing angle is zero only at the small areas of the two ends, while most of the rest of the intermediate area has a higher mold drawing angle. The mold injection is easy to be drawn mold, and the precision of the injection product and the assembly are easy to be controlled. The drawbacks of the conventional technique are efficiently solved so that the life-span and the precision of the mold are both higher. In addition, the aforesaid module 30 can be formed by die-casting.

The shaft sleeve structure in the present invention is to be used in the module which can be an optic module in an image scanner, an optic module in a copy machine, or a printing head module in a printer.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method of manufacturing a shaft sleeve structure for use in an optic module capable of being slid along a guiding shaft, comprising steps of:
   (a) providing a slider comprising a first segment, a second segment and a central segment, wherein said first segment has an internal diameter larger than that of said second segment, and said central segment has an internal diameter gradually tapered from said first segment to said second segment;
   (b) encapsulating said first segment, said second segment and said central segment of said slider within said optic module when forming said optic module;
   (c) providing a driving force for drawing out said slider from said second segment toward said first segment and defining a passage in said optic module; and
   (d) mounting a first bearing and a second bearing at two opening ends of said passage respectively, wherein said first bearing has an internal diameter the same as that of said second bearing.

2. The method according to claim 1, wherein said internal diameter of said central segment of said slider decreases linearly from said first segment to said second segment.

3. The method according to claim 1, wherein said internal diameter of said central segment of said slider decreases non-linearly from said first segment to said second segment.

4. The method according to claim 1, wherein each of said first and second bearing is made of a material selected from one of plastic and metal.

5. The method structure according to claim 1, wherein said optic module is in an image scanner.

6. The method according to claim 1, wherein said optic module is in a copy machine.

7. The method according to claim 1, wherein said driving force is provided by an oil pressure pump.

8. The method according to claim 1, wherein said optic module is formed by injection molding.

9. The method according to claim 1, wherein said optic module is formed by die-casting.

* * * * *